(12) United States Patent  
Wikström

(10) Patent No.: US 8,533,303 B2
(45) Date of Patent: Sep. 10, 2013

(54) NETWORK MANAGEMENT SYSTEM NODE AND METHOD FOR USE IN A NETWORK MANAGEMENT SYSTEM NODE FOR RE-CONFIGURING A SET OF DATA NETWORK NODES IN A DATA NETWORK

(75) Inventor: Claes Wikström, Hägersten (SE)

(73) Assignee: Tail-f Systems AB, Stockholm (SE)

( * ) Notice: Subject to any disclaimer, the term of this patent is extended or adjusted under 35 U.S.C. 154(b) by 90 days.

(21) Appl. No.: 13/229,588

(22) Filed: Sep. 9, 2011

(65) Prior Publication Data

US 2013/0067047 A1 Mar. 14, 2013

(51) Int. Cl.
*G06F 15/16* (2006.01)
(52) U.S. Cl.
USPC .......................................... 709/221; 709/220
(58) Field of Classification Search
USPC ................... 709/200–203, 217–227, 228
See application file for complete search history.

(56) References Cited

U.S. PATENT DOCUMENTS

| 7,644,182 B2 * | 1/2010 | Banerjee et al. ............... 709/242 |
| 2005/0201278 A1 * | 9/2005 | Banerjee et al. ............... 370/229 |
| 2006/0133405 A1 * | 6/2006 | Fee .................................. 370/437 |
| 2009/0100158 A1 | 4/2009 | Sonkin et al. |

* cited by examiner

*Primary Examiner* — Moustafa M Meky
(74) *Attorney, Agent, or Firm* — Morrison & Foerster LLP

(57) ABSTRACT

The present disclosure relates to a network management system node for re-configuring a set of data network nodes in a data network in response to a change management request requesting a creation of a network service to be performed in the data network. The network management system node is characterized in that it includes a processing unit configured to store each change of network service information in created, added and/or updated data network nodes in the resulting set of data network nodes established by the re-configuration of the set of data network nodes based on the change management request requesting the creation of the network service as a change-set of network service information, and associate the change-set of network service information with a network service instance indicating the moment of the creation of the network service.

14 Claims, 5 Drawing Sheets

NETWORK MANAGEMENT SYSTEM NODE AND METHOD FOR USE IN A NETWORK MANAGEMENT SYSTEM NODE FOR RE-CONFIGURING A SET OF DATA NETWORK NODES IN A DATA NETWORK

TECHNICAL FIELD

The invention relates to the field of network management systems for use in data networks, in particular to a network management system node for re-configuring a set of data network nodes in a data network. The invention also relates to a method for use in a network management system node for re-configuring a set of data network nodes in a data network.

BACKGROUND

In today's network management systems (NMS) there is a desire to be able to configure services in a data network instead of the individual managed devices or nodes in the data network. However, the creation of a service instance in a data network, typically effects several managed devices or nodes. Thus, the manifestation of a service in a data network, typically consists of a series of reconfigurations of several different managed devices or nodes in the data network.

FIG. 1 shows an example of a data network 10. The data network 10 comprises three provider edge (PE) routers 11, 12, 13 and five customer equipment (CE) routers 14, 15, 16, 17, 18. These are examples of the managed devices or nodes in a data network referred to above. A virtual private network (VPN) is an example of a service in the data network 10.

A VPN service may connect the data networks behind the CE routers 14, 15, 16, 17, 18, such that IP traffic can flows between these data networks. For example, assume that a VPN service is desired between the data network behind the CE router 14 (e.g. a main office) and the data network behind the CE router 15 (e.g. a local office). In order for an operator to be able to create and provide the VPN service, the operator must reconfigure both PE routers 12, 13 and both CE routers 14, 15.

FIG. 2 shows another example of a data network 20. The data network 20 comprises a load balancer (LB) 24 and a set of web servers 21, 22, 23. These are other examples of the managed devices or nodes in a data network referred to above. Also, here, the data network 20 further comprises a NMS node 26, which also may be referred to as a network configuration system server or similar, and a user interface 27 configured to enable an operator to communicate with the NMS node 26. The concept of a website is an example of a service in the data network 20.

For example, creating a website may typically entail reconfiguring the load balancer (LB) 24 with an external IP address, reconfiguring the load balancer (LB) 24 so that it load balances this external IP address towards a set of web servers 21, 22, 23, reconfiguring each of the web servers in the set of webservers 21, 22, 23 with a new internal, virtual IP address, and finally configuring a new virtual host entry together with the contents of the website on each of the web servers in the set of webservers 21, 22, 23.

Both these two examples illustrate the concept of a high level service, which when created or manipulated will result in a series of reconfigurations of several managed devices or nodes in their respective data network. A standard NMS solution employed in most data networks today is as follows:

Creating a data model of the high level service;
Write software/program code where instances of the service can be created using, for example, a software or computer program product with a user interface through which, for example, a VPN or a website can be created;
Write software/program code that executes the changes to the involved managed devices or nodes in the data network when the service is created;
Write software/program code for handling modifications to existing services and deletion of existing services.

However, assume that an operator is attempting to change the VPN service illustrated in the example above by, for example, adding another CE router 16, 17, 18 or by changing some of the service attributes (such as, e.g. quality of service (QoS) attributes) associated to the VPN service instance. Using the standard NMS solution, there must be a software/program that runs in the NMS node that knows how to handle all possible changes to the service instance. If the service is complex, the software/program code to handle changes, modifications and deletions of service instances is typically considerably more complex than the software/program code needed to actually create the service instance in the first place. This increases the programming complexity and workload for the service application programmer.

SUMMARY

It is an object to obviate at least some of the above disadvantages and provide a network management system which reduces the programming complexity and workload for a service application programmer.

The object is addressed by a network management system node for re-configuring a set of data network nodes in a data network in response to a change management request requesting a creation of a network service to be performed in the data network is provided. The network management system node is characterised in that it comprises a processing unit configured to store each change of network service information in created, added and/or updated data network nodes in the resulting set of data network nodes established by the re-configuration of the set of data network nodes based on the change management request requesting the creation of the network service as a change-set of network service information, and associate the change-set of network service information with a network service instance indicating the moment of the creation of the network service.

The object is further addressed by a method for use in a network management system (NMS) node for re-configuring a set of data network nodes in a data network, comprising: receiving a change management request requesting a creation of a network service to be performed in the data network. The method is being characterised by comprising: storing each change of network service information in created, added and/or updated data network nodes in the resulting set of data network nodes established by the re-configuration of the set of data network nodes based on the change management request requesting the creation of the network service as a change-set of network service information; and associating the change-set of network service information with a network service instance indicating the moment of the creation of the network service.

One advantage of the above mentioned network management system node and method is that, where previously an operator or a service application programmer would have been forced to implement a software/program code for the handling of creation, modification and deletion of each instantiated network service which is to be implemented in a data network, the service application programmer may by using the method and network management system (NMS) node as described above only have to implement software/ program code for the case where the service is created. The modification and deletion of a service is subsequently enabled to be handled automatically. This will reduce the programming complexity and workload for the service application programmer, and thus ease the burden on the service application programmer.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein.

DETAILED DESCRIPTION

Figure 1:
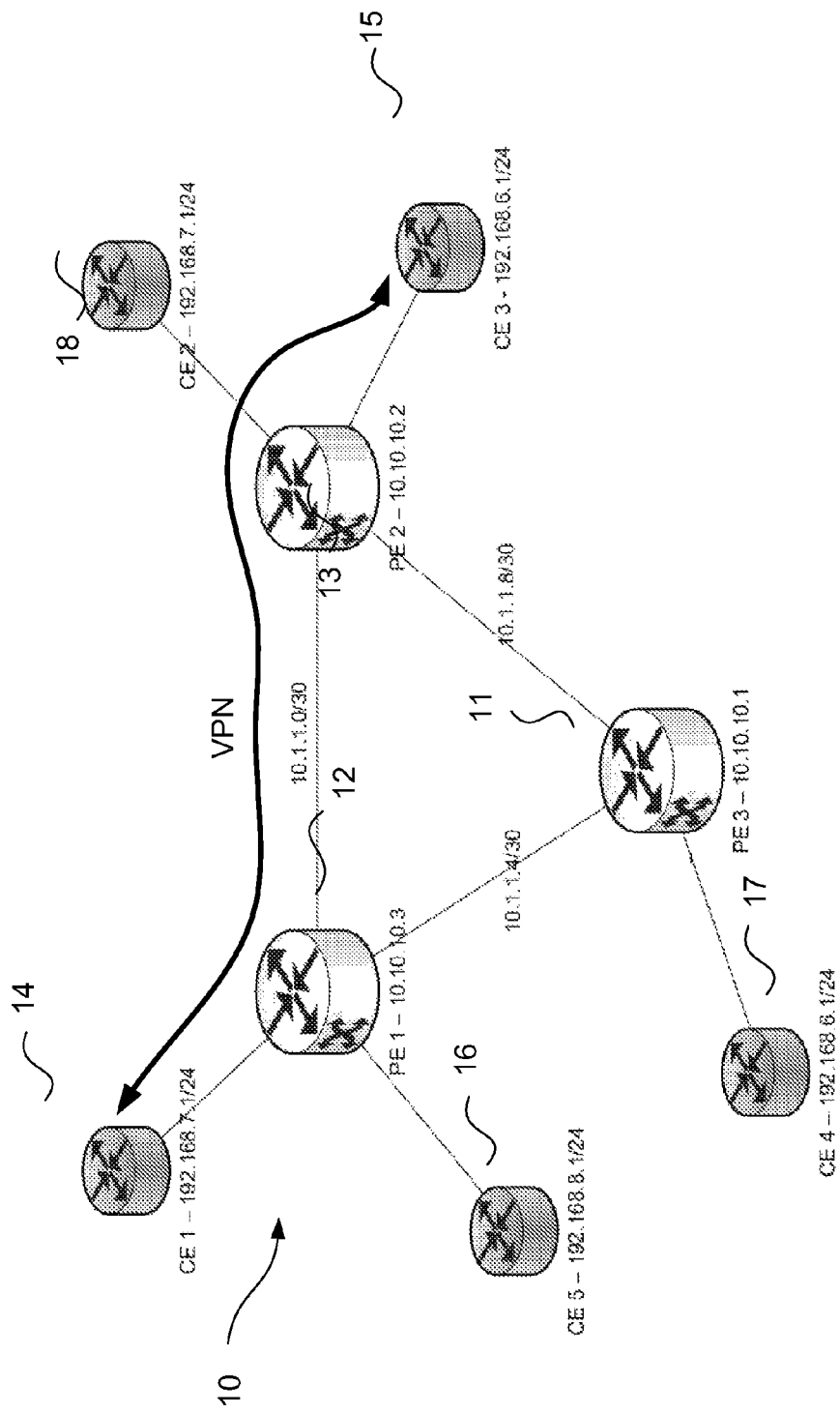
FIG. 1 schematically illustrates an example of a data network in which the embodiments of the invention may be implemented, FIG. 2 schematically illustrates an example of another data network in which the embodiments of the invention may be implemented, FIG. 3 schematically illustrates an exemplary embodiment of a network management system node according to the invention, FIG. 4 schematically illustrates a first exemplary operation according to an embodiment of the invention and a corresponding flow chart, FIG. 5 schematically illustrates a second exemplary operation according to an embodiment of the invention and a corresponding flow chart, and FIG. 6 schematically illustrates a third exemplary operation according to an embodiment of the invention and a corresponding flow chart.

The figures are schematic and simplified for clarity, and they merely show details which are essential to the understanding of the invention, while other details have been left out. Throughout, the same reference numerals are used for identical or corresponding parts or steps.

Figure 3:
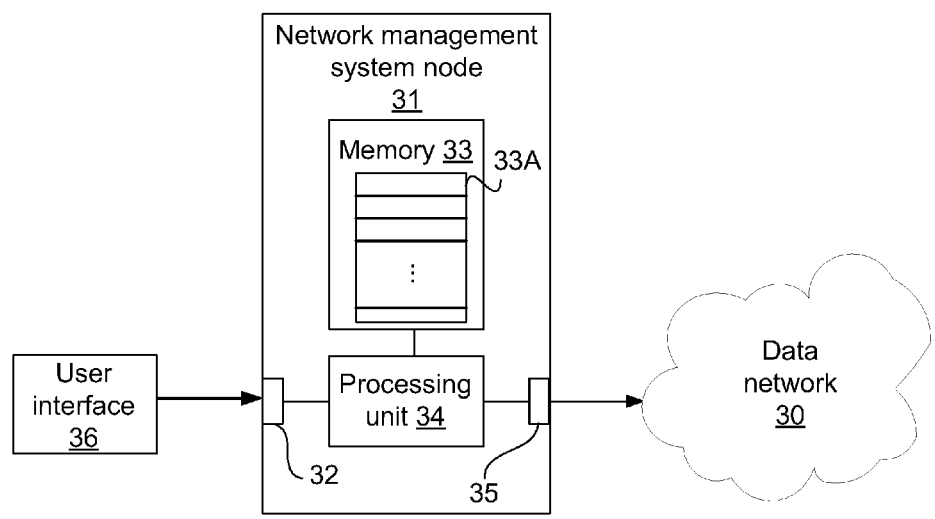

FIG. 3 shows a network management system (NMS) node 31 for re-configuring a set of data network nodes in a data network 30 according to an embodiment of the invention. The NMS node 31 may also be referred to as a network configuration system (NCS) server or similar. The NMS node 31 may comprise an input unit 32, a processing unit 34, a memory unit 33 and an output unit 35. The input unit 32 may be connectable to and/or be configured to communicate with a user interface 36, e.g. over the data network 30. The data network 30 may, for example, be the data network 10 in FIG. 1 or the data network 20 in FIG. 20.

It should be noted that the input unit 32, the processing unit 34, the memory unit 33 and the output unit 35 may be provided as one physical unit, or alternatively as a plurality of logically interconnected units. The processing unit 34 may comprise processing means or logic for performing the functionality of the NMS node 31 according to the method as described by the various embodiments of the invention in reference to FIGS. 4-6. This functionality may be implemented at least partly by means of a software or computer program. The processing unit 34 may also comprise storage means or memory units for storing such a computer program 33A or processing means and a computer processor, such as a microprocessor, for executing the computer program 33A. The storage means may be a readable storage medium. Alternatively, the storage means may be comprised in the memory unit 33 which is separated from, but connected to the processing unit 34. When, in the following, it is described that the NMS node 31 performs a certain function or operation it is to be understood that the input unit 32, the processing unit 34, the memory unit 33 and/or the output unit 35 in the NMS node 31 may use the processing means or logic to execute a certain part of the program 23A which is stored in the storage means.

Figure 4:
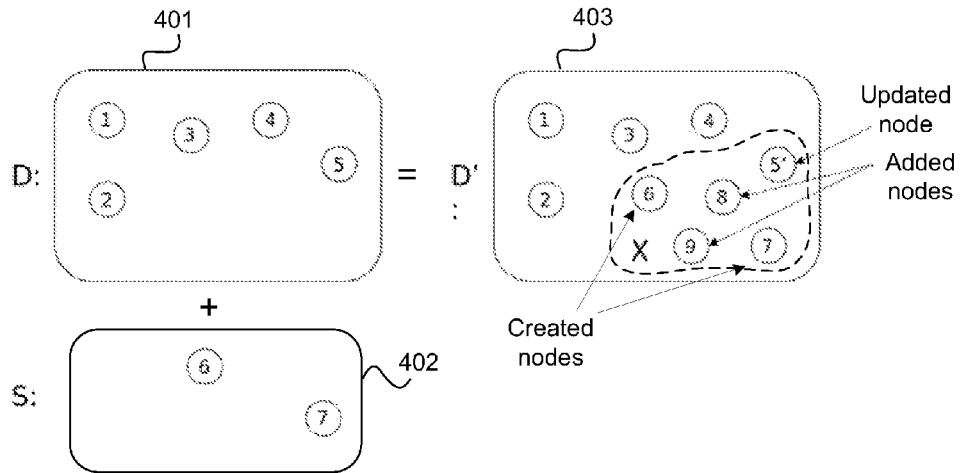
Figure 4:
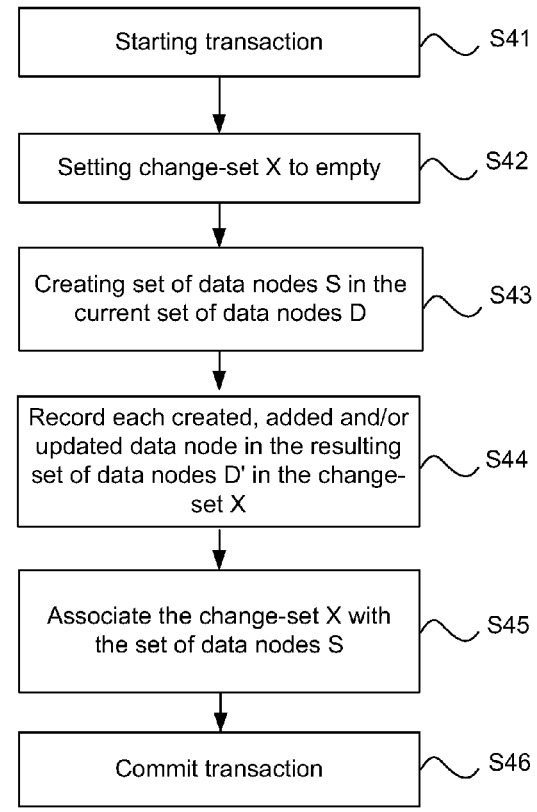

FIG. 4 schematically illustrates a first exemplary operation according to an embodiment of the invention and a corresponding flow chart. This first exemplary operation may also be referred to as the create operation. It should be noted that it is this create operation that provides and forms the basis from which it is possible to achieve and implement the second and third exemplary operations described below in reference to FIGS. 5-6, i.e. the deletion operation and modification operation.

In step S41, a transaction operation is started. This corresponds to an operator giving network service data to the NMS node 31, i.e. an operator initiating a change management request. This may be performed by the operator by, for example, using the user interface 36. In this case, the change management request may be initiated by the operator when desiring to create a network service, such as, for example, a VPN or a website. Thus, a change management request may be received in the NMS node 31.

Figure 2:
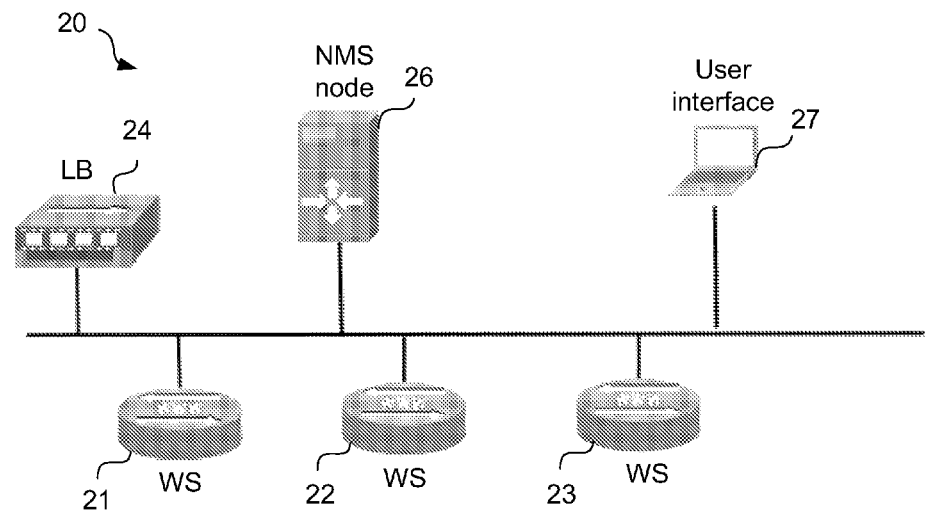

The received change management request may comprise a request for the creation of a network service to be performed at least partly by at least one of the data network nodes 1-5 in the current set D of data network nodes 401 in FIG. 4. The request for the creation of the network service may also require the creation of one or more new data network nodes configured to perform the network service, such as, for example, the data network nodes 6-7 defined by a further set S of data network nodes 402 in FIG. 4. It should be noted that all attributes required by the network service software in the NMS node 31 to be able to set up the network service must be part of the request for the creation of the network service. For example, a VPN network service instance may require the request for the creation of the VPN network service instance to comprise all PEs, CEs, and all IP addresses involved in the VPN. In FIG. 1, for example, this may comprise the PE routers 12, 13, the CE routers 14, 15, and their IP addresses. According to another example, a website network service instance may require the request for the creation of the website network service instance to comprise the IP address of the website itself, the website contents and an indication on which web servers the site should run. In FIG. 2, for example, this may comprise the external IP address of the load balancer LB 24, the internal virtual IP address of the one or more web servers WS 21, 22, 23 to be used, and also, the contents of the website. Thus, the NMS node 31 is configured to enable a transaction operation operable to cause the creation of the network service by re-configuring the current set D of data network nodes 401 into a resulting set D' of data network nodes 403 based on the change management request requesting the creation of the network service.

As an alternative, in step S42, in case a change-set X of data network nodes is not empty, the change-set X may here be emptied and reset by the NMS node 31. This alternative step may be performed in subsequent create operations following an initial first create operation.

In step S43, the further set S of data network nodes 402, for example, the data network nodes 6-7, is created by the NMS node 31 in the current set D of data network nodes 401, for example, the data network nodes 1-5. This means that the NMS node 31 may execute software/program code that creates the further set S of data network nodes 402 in the current set D of data network nodes 401. This software/program code may be referred to as a network service code, and is the software/program code that is given the instantiated network service, such as, for example, the VPN network service or the website network service. The task of this network service code is to read the attributes of the network service instance comprised in the change management request and determine which changes have to be made in which data network elements in order to perform the network service. The data elements may, for example, be the PE routers 12, 13 and the CE routers 14, 15 in FIG. 1 for a VPN network service instance, or the load balancer LB 24 and the one or more web servers WS 21, 22, 23 in FIG. 3 for a website network service instance. Note that the network service code where instances of the network service are created is provided by the application programmer/operator in view of the applicable data model of the network service.

When this network service code has finished the re-configuration of the current set D of data network nodes 401, the resulting set D' of data network nodes 403 may comprise:
  one or more unchanged data nodes, such as, for example, data network nodes 1-4 that are not to be used by the instantiated network service;
  one or more updated data nodes, such as, for example, a data network node 5' that was already present in the previous set D of data network nodes 401, but needed to update some of its attributes in order to be used by the instantiated network service;
  one or more created data nodes, such as, for example, the data network nodes 6-7 of the further set S of data network nodes 402 that are created to perform the instantiated network service; and/or
  one or more added data nodes, such as, for example, data network nodes 8-9 that the network service code has determined is necessary to establish in order for the instantiated network service to be able to be performed.

In step S44, each created, added and/or updated data network node, for example, the data network nodes 5', 6-7, 8-9, in the resulting set D' of data network nodes 403 is recorded by the NMS node 31 as a change-set X of data network nodes. This also means that each change of network service information or attributes in the created, added and/or updated data network nodes 5', 6-7, 8-9 in the resulting set D' of data network nodes 403 is stored by the NMS node 31 as part of the change-set X of data network nodes. Thus, the change-set X of data network nodes may also be referred to as a change-set of network service information.

In step S45, the change-set X is associated by the NMS node 31 with the further set S of data nodes 402, such as, for example, the data network nodes 6-7 that are created to perform the instantiated network service. This will associate the further set S of data nodes 402 and the change-set X of data network nodes 5', 6-7, 8-9, or network service information, with the network service instance and thus the moment of the creation of the network service in the data network 30.

In step S46, the NMS node 31 commits the transaction operation to the data network 30. This may performed in order to instantiate and mutually configure the resulting set D' of data network nodes 403 in the data network 30 in accordance with the creation operation described above.

It should also be noted that the NMS node 31 may be configured to retrieve and use the stored change-set X of data network nodes 5', 6-7, 8-9, or network service information, in subsequent re-configurations of the resulting set D' of data network nodes 403 based on subsequent change management requests. This is described in more detail in reference to FIGS. 5-6 below.

Figure 5:
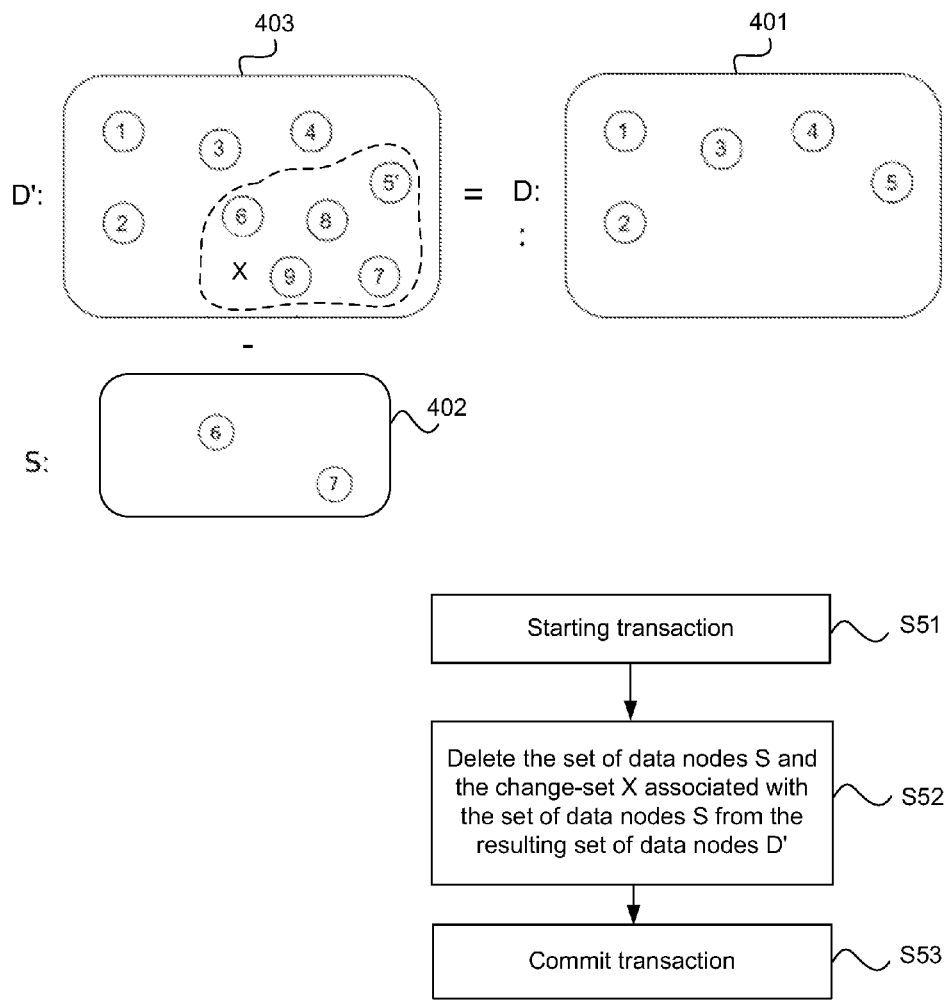

FIG. 5 schematically illustrates a second exemplary operation according to an embodiment of the invention and a corresponding flow chart. This second exemplary operation may also be referred to as the delete operation.

In step S51, a transaction operation is started. This corresponds to an operator giving network service data to the NMS node 31, i.e. an operator initiating a change management request. This may be performed by the operator by, for example, using the user interface 36. In this case, the change management request may be initiated by the operator when desiring to delete an existing network service in the data network 30, such as, for example, a VPN or a website. Thus, a change management request may be received in the NMS node 31.

The received change management request may comprise a request for the deletion of an existing network service being performed by at least one of the data network nodes 1-4, 5', 6-9 in the resulting set D' of data network nodes 403, such as, for example, the network service that was created in the data network 30 as described above in reference to FIG. 4. In this case, the network service instance in which this network service was created and the data network nodes 6-7 defined by the further set S of data network nodes 402 created to perform the instantiated network service will thus be associated with a change-set X of data network nodes.

In step S52, the NMS node 31 may delete the data network nodes 6-7 defined by the further set S of data network nodes 402 created to perform the instantiated network service from the resulting set D' of data nodes 403. The NMS node 31 may also delete the change-set X associated with the further set S of data nodes 402 from the resulting set D' of data nodes 403. This may be performed by deleting each change of network service information in each of the created, added and/or updated data network nodes 5', 6-9 according to the change-set X of data nodes or network service information. This means that the NMS node 31 may execute software/program code that automatically deletes the effects of a created network service and cleans up what the network service code did to the data network 30 on behalf of that service instance when the network service was created. Thus, no specific software/program code has to be developed and provided by an operator in order to remove a network service. Alternatively, the change-set X may here also be emptied and reset by the NMS node 31.

In step S53, the NMS node 31 commits the transaction to the data network 30. This may be performed in order to instantiate and mutually configure the resulting set D' of data network nodes 401 in the data network 30 in accordance with the delete operation described above. This will yield a new set D of data network nodes 401, i.e. the same set D of data network nodes 401 or network service information as was present in the data network 30 prior to the creation operation described in reference to FIG. 4.

In other words, as an application programmer or operator have written software/program code, i.e. the network service code, that is able to create a network service in the data network 30, the NMS node 31 is arranged to determine from this software/program code which changes that are to be done to which network element in order to make the network service work in the data network 30. The NMS node 31 records and store these changes such that, when the network service instance is to be removed, the NMS node 31 may create a transaction operation in which all the changes done to all network elements by the software/program code are removed. Thus, the application programmer or operator is alleviated of the burden of having to write further software/program code for dealing with the case of deleting the network service instance.

Figure 6:
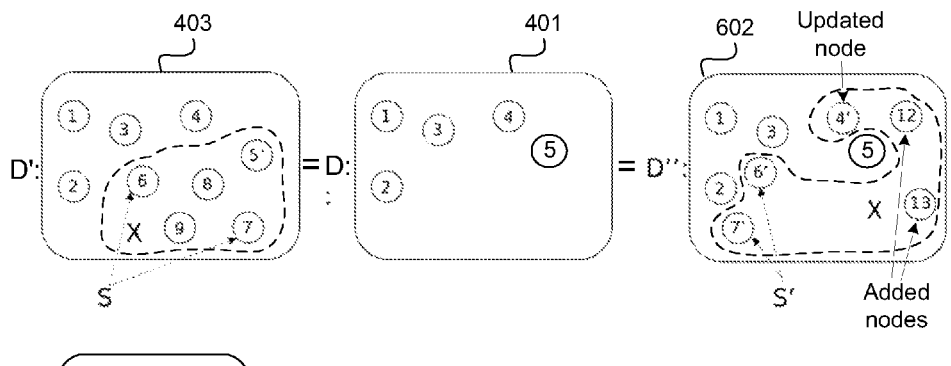
Figure 6:
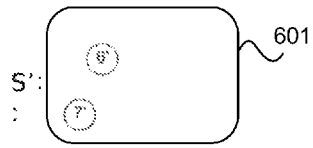
Figure 6:
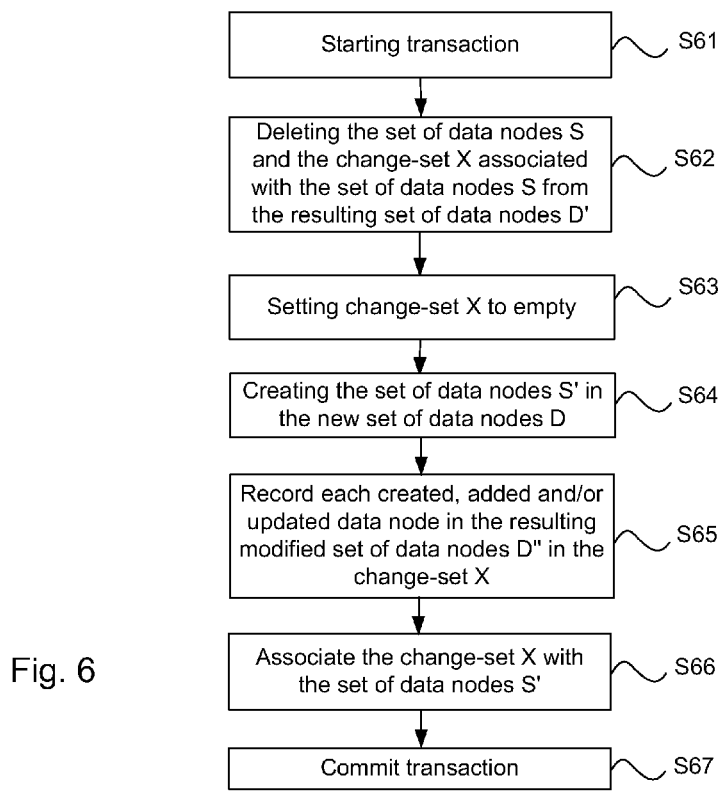

FIG. 6 schematically illustrates a third exemplary operation according to an embodiment of the invention and a corresponding flow chart. This third exemplary operation may also be referred to as the modification operation.

In step S61, a transaction operation is started. This corresponds to an operator giving network service data to the NMS node 31, i.e. an operator initiating a change management request. This may be performed by the operator by, for example, using the user interface 36. In this case, the change management request may be initiated by the operator when desiring to modify an existing network service, such as, for example, a VPN or a website. For example, the modification may comprise adding a set of routers to or changing the quality of service parameters for a VPN, or adding another web server to or changing the port number of a website. Thus, a change management request may be received in the NMS node 31.

The received change management request may comprise a request for the modification of an existing network service being performed by at least one of the data network nodes 1-4, 5', 6-9 in the resulting set D' of data network nodes 403, such as, for example, the network service that was created in the data network 30 as described above in reference to FIG. 4. For example, a request for the modification of the data network nodes 6, 7 defined by the further set S of data network nodes created to perform the instantiated network service into the data network nodes 6', 7' in a modified set S' of data network nodes 601 for performing a modified instantiated network service in the data network 30. In this case, the network service instance in which this network service was created and the data network nodes 6, 7 defined by the further set S of data network nodes 402 created to perform the instantiated network service will also be associated with a change-set X of data network nodes.

In step S62, the NMS node 31 may delete the data network nodes 6, 7 defined by the further set S of data network nodes 402 created to perform the instantiated network service from the resulting set D' of data nodes 403. The NMS node 31 may also delete the change-set X associated with the further set S of data nodes 402 from the resulting set D' of data nodes 403. This may be performed by deleting each change of network service information in each of the created, added and/or updated data network nodes 5', 6-9 according to the change-set X of data nodes or network service information. This means that the NMS node 31 may execute software/program code that automatically deletes the effects of a created network service and cleans up what the network service code did to the data network 30 on behalf of that service instance when the network service was created. Thus, no specific software/program code has to be developed and provided by an operator in order to remove this network service. Alternatively, in step S63, the change-set X may here be emptied and reset by the NMS node 31. This will define a new set D of data network nodes 401, i.e. the same set D of data network nodes 401 or network service information as was present in the data network 30 prior to the creation operation described in reference to FIG. 4.

In step S64, the data network nodes 6', 7' in the modified set S' of data network nodes 601 is created by the NMS node 31 in the new set D of data network nodes 401. This means that the NMS node 31 may execute software/program code that creates the data network nodes 6', 7' in the modified set S' of data network nodes 601 in the new set D of data network nodes 401. This software/program code may be referred to as a network service code. When this network service code has finished the re-configuration of the new set D of data network nodes 401, the resulting modified set D" of data network nodes 602 may comprise:

- one or more unchanged data nodes, such as, for example, data network nodes 1-3, 5 that may not to be used by the instantiated network service;
- one or more updated data nodes, such as, for example, a data network node 4' that was already present in the new set D of data network nodes 401, but needed to update some of its attributes in order to be used by the modified network service;
- one or more created data nodes, such as, for example, the data network nodes 6'-7' of the modified set S' of data network nodes 601 that are created to perform the modified network service; and/or
- one or more added data nodes, such as, for example, data network nodes 12-13 that the network service code has determined is necessary to establish in order for the modified network service to be able to be performed.

Thus, the NMS node 31 is configured to in this manner re-configure the data network nodes 1-5 in the new set D of data network nodes 401 after the deletion, into a resulting modified set D" of data network nodes 602, i.e. the data network nodes 1-3, 4', 5, 6'-7', 12-13, based on the change management request requesting the modification of the network service.

In step S65, each created, added and/or updated data network node 4', 6'-7', 12-13 in the resulting modified set D" of data network nodes 602 is recorded by the NMS node 31 as the change-set X of data network nodes. This also means that each change of network service information in the created, added and/or updated data network nodes 4', 6'-7', 12-13 in the resulting modified set D" of data network nodes 602 is stored by the NMS node 31 as part of the change-set X of data network nodes. Thus, as previously mentioned, the change-set X of data network nodes may also be referred to as a change-set of network service information.

In step S66, the change-set X is associated by the NMS node 31 with the modified set S' of data nodes 601, i.e. the data network nodes 6', 7', that is created to perform the modified network service. This will associate the change-set X' of data network nodes 4', 6'-7', 12-13 with the network service instance and thus the moment of the modification of the network service in the data network 30.

In step S67, the NMS node 31 commits the transaction to the data network 30. This may be performed in order to instantiate and mutually configure the data network nodes 1-3, 4', 5, 6'-7', 12-13 in the resulting modified set D" of data network nodes 602 in the data network 30.

In other words, as an application programmer or operator have written software/program code, i.e. network service code, that is able to create a network service in the data network 30, the NMS node 31 is arranged to determine from this software/program code which changes that are to be done to which network element in order to make the network service work in the data network 30. The NMS node 31 records and stores these changes. This is performed such that, when the created network service instance is modified, the NMS node 31 may create a transaction operation in which: first, all the changes done to all network elements by the software/program code are removed, and then secondly, following the removal, the software/program code that is able to re-create the network service in the data network 30. This time, however, the network service code may be provided with different input parameters as compared to when the initial network service was created by the network service code. This will then create the new modified network service. Thus, the application programmer or operator is alleviated of the burden of having to write further software/program code for dealing with the case of modifying a network service instance.

Note that the steps described above executes inside the transaction operations and no real changes to the network elements (i.e. involved managed devices) in the data network 30 occur until the entire transaction operation is committed. Furthermore, when using the nested transaction operation as described in the modification operation, where data nodes or network service information are first removed and then recreated, a transaction manager may be used in order to handle the transaction operation in a suitable manner. Thus, the actual changes that are sent to the network elements in the data network 30 does not have to correspond to first removing all the relevant data nodes or network service information, and then secondly recreating all the relevant data nodes or network service information, but may be handled by the transaction manager so as not to cause any service disruption.

It should also be noted that in addition to the exemplary embodiments shown in the accompanying drawings, the invention may be embodied in different forms and therefore should not be construed as limited to the embodiments set forth herein. Rather, these embodiments are provided so that this disclosure will be thorough and complete, and will fully convey the concept of the invention to those skilled in the art.

The invention claimed is:

1. A network management system [NMS] node for re-configuring a set of data network nodes in a data network in response to a change management request requesting a creation of a network service to be performed in the data network, the network management system node comprising a processing unit configured to:
    receive network service code operable to cause creation of the network service in the data network based on the change management request requesting the creation of the network service;
    determine, based on the received network service code, each change of network service information in created, added and/or updated data network nodes in the resulting set of data network nodes to be established by the reconfiguration of the set of data network nodes in order to make the network service operable;
    store each determined change as a change-set of network service information;
    associate the change-set of network service information with a network service instance indicating the moment of the creation of the network service; and
    retrieve and use the stored change-set of network service information in a subsequent re-configuration of the resulting set of data network nodes based on a subsequent change management request requesting a deletion or a modification of the service resulting from the change management request requesting the creation of the network service so as to enable automatic deletion or modification of the service without requiring additional network service code operable to cause deletion or modification.

2. A network management system node according to claim 1, wherein, in response to the change management request, the processing unit is further configured to:
    enable a transaction operation operable to cause the creation of the network service by re-configuring the set of data network nodes into the resulting set of data network nodes based on the change management request requesting the creation of the network service, and
    commit the transaction operation to the data network in order to instantiate and mutually configure the resulting set of data network nodes in the data network.

3. A network management system node according to claim 1, wherein, in response to a subsequent change management request requesting a modification of an existing network service being performed by at least one of the data network nodes in the resulting set of data network nodes, the processing unit is configured to:
    enable a transaction operation operable to cause the modification of the network service by:
    deleting each change of network service information in created, added and/or updated data network nodes in the change-set of network service information associated with the network service instance corresponding to the creation of the network service that is to be modified,
    re-configuring the remaining set of data network nodes into a modified set of data network nodes based on the change management request requesting the modification of the network service,
    storing each change of network service information in created, added and/or updated data network nodes in the modified set of data network nodes as the change-set of network service information,
    associating the change-set of network service information with a network service instance indicating the moment of the modification of the network service, and
    commit the transaction operation to the data network in order to instantiate and mutually configure the modified set of data network nodes in the data network.

4. A network management system node according to claim 1, wherein, in response to a subsequent change management request requesting a deletion of an existing network service being performed by at least one of the data network nodes in the resulting set of data network nodes, the processing unit is configured to:
    enable a transaction operation operable to cause the deletion of the network service by deleting each change of network service information in created, added and/or updated data network nodes in the change-set of network service information associated with the network service instance corresponding to the creation of the network service that is to be deleted, and
    commit the transaction operation to the data network in order to instantiate and mutually configure the set of data network nodes in the data network.

5. A network management system node according to claim 1, wherein the change management request is based on a data model describing the network service in the data network and is mapped to corresponding network service information in one or more data network nodes in the data network for implementing the network service.

6. A network management system node according to claim 1, wherein the data network is a website server network and the data network nodes comprises a load balancing node and at least one webserver.

7. A network management system node according to claim 1, wherein the data network is MPLS-VPN network and the data network nodes comprises at least one customer edge node, and at least one provider edge node.

8. A website server network comprising a network management system node according to claim 1.

9. A MPLS-VPN network comprising a network management system node according to claim 1.

10. A method for use in a network management system [NMS] node for re-configuring a set of data network nodes in a data network, the method comprising:

receiving a change management request requesting a creation of a network service to be performed in the data network;

receiving network service code operable to cause creation of the network service in the data network based on the change management request requesting the creation of the network service;

determining, based on the received network service code, each change of network service information in created, added and/or updated data network nodes in the resulting set of data network nodes to be established by the reconfiguration of the set of data network nodes in order to make the network service operable;

storing each determined change as a change-set of network service information;

associating the change-set of network service information with a network service instance indicating the moment of the creation of the network service; and retrieving and using the stored change-set of network service information in subsequent re-configurations of the resulting set of data network nodes based on subsequent change management requests requesting a deletion or a modification of the service resulting from the change management request requesting the creation of the network service so as to enable automatic deletion or modification of the service without requiring additional network service code operable to cause deletion or modification.

11. A method according to claim 10, further comprising:
enabling a transaction operation operable to cause the creation of the network service by re-configuring the set of data network nodes into the resulting set of data network nodes based on the change management request requesting the creation of the network service; and committing the transaction operation to the data network in order to instantiate and mutually configure the resulting set of data network nodes in the data network.

12. A method according to claim 10, further comprising:
receiving a subsequent change management request requesting a modification of an existing network service being performed by at least one of the data network nodes in the resulting set of data network nodes;

enabling a transaction operation operable to cause the modification of the network service by:

deleting each change of network service information in created, added and/or updated data network nodes in the change-set of network service information associated with the network service instance corresponding to the creation of the network service that is to be modified, re-configuring the remaining set of data network nodes into a modified set of data network nodes based on the change management request requesting the modification of the network service, storing each change of network service information in created, added and/or updated data network nodes in the modified set of data network nodes as the change-set of network service information, associating the change-set of network service information with a network service instance indicating the moment of the modification of the network service; and committing the transaction operation to the data network in order to instantiate and mutually configure the modified set of data network nodes in the data network.

13. A method according to claim 10, further comprising:
receiving a subsequent change management request requesting a deletion of an existing network service being performed by at least one of the data network nodes in the resulting set of data network nodes;

enabling a transaction operation operable to cause the deletion of the network service by deleting each change of network service information in created, added and/or updated data network nodes in the change-set of network service information associated with the network service instance corresponding to the creation of the network service that is to be deleted, and committing the transaction operation to the data network in order to instantiate and mutually configure the set of data network nodes in the data network.

14. A method according to claim 10, wherein the change management request is based on a data model describing the network service in the data network and is mapped to corresponding network service information in one or more data network nodes in the data network for implementing the network service.

* * * * *